(12) United States Patent
Palaoro et al.

(10) Patent No.: US 8,474,475 B2
(45) Date of Patent: Jul. 2, 2013

(54) VALVE ARRANGEMENT AND CONSTRUCTION KIT FOR A VALVE ARRANGEMENT

(75) Inventors: Renato Palaoro, Heidenheim (DE); Andreas Gerstenlauer, Heidenheim (DE)

(73) Assignee: Alligator Ventilfabrik GmbH, Giengen (DE)

( * ) Notice: Subject to any disclaimer, the term of this patent is extended or adjusted under 35 U.S.C. 154(b) by 228 days.

(21) Appl. No.: 12/298,045

(22) PCT Filed: Nov. 28, 2007

(86) PCT No.: PCT/EP2007/010302
§ 371 (c)(1),
(2), (4) Date: Dec. 23, 2008

(87) PCT Pub. No.: WO2008/064869
PCT Pub. Date: Jun. 5, 2008

(65) Prior Publication Data
US 2009/0229676 A1 Sep. 17, 2009

(30) Foreign Application Priority Data
Nov. 28, 2006 (DE) .......................... 10 2006 056 470

(51) Int. Cl.
*F16K 15/20* (2006.01)
(52) U.S. Cl.
USPC ......................................... 137/227; 73/146.8
(58) Field of Classification Search
USPC ................................ 137/227; 73/146.2, 146.8
See application file for complete search history.

(56) References Cited

U.S. PATENT DOCUMENTS

| 1,305,262 | A | * | 6/1919 | Earnheart | 137/227 |
|---|---|---|---|---|---|
| 2,855,229 | A | * | 10/1958 | Winslow | 403/283 |
| 3,007,726 | A | * | 11/1961 | Parkin | 403/372 |
| 4,048,614 | A | * | 9/1977 | Shumway | 340/447 |
| 4,586,734 | A | * | 5/1986 | Grenier | 285/340 |
| 5,844,131 | A | | 12/1998 | Gabelmann et al. | |
| 6,101,870 | A | | 8/2000 | Kato et al. | |
| 6,167,900 | B1 | * | 1/2001 | Laird | 137/227 |
| 6,568,259 | B2 | * | 5/2003 | Saheki et al. | 73/146.2 |
| 7,017,403 | B2 | | 3/2006 | Normann et al. | |
| 7,059,178 | B2 | | 6/2006 | Fischer et al. | |

(Continued)

FOREIGN PATENT DOCUMENTS

| DE | 4106502 | 9/1992 |
|---|---|---|
| DE | 19613936 | 10/1997 |

OTHER PUBLICATIONS

European Patent Office, DE4106502, Machine translation Jun. 13, 2011.*

*Primary Examiner* — Craig Schneider
*Assistant Examiner* — Craig J Price
(74) *Attorney, Agent, or Firm* — Bachman & LaPointe, P.C.

(57) ABSTRACT

A valve arrangement (1) comprising a valve body (2) for inflating and deflating a vehicle tire and comprising a measuring device (8) for measuring the tire pressure, in which the measuring device (8) is secured on the valve body (2) against axial movement in a pulling direction (Z) away from the valve body (2) by a securing element. The securing element has a profiled element (15) with a fixing element (20) acting on the valve body (2). Furthermore, a construction kit for such a valve arrangement is provided. The profiled element can connect the valve body (2) in a signal-conducting manner to an electronic transmitting unit.

18 Claims, 3 Drawing Sheets

U.S. PATENT DOCUMENTS

| | | |
|---|---|---|
| 7,257,998 B2 * | 8/2007 | Luce .......................... 73/146.8 |
| 2003/0066343 A1 * | 4/2003 | Fischer et al. ................. 73/146 |
| 2003/0067170 A1 * | 4/2003 | Snyder et al. ................. 285/340 |
| 2005/0087007 A1 | 4/2005 | Uleski |
| 2006/0288924 A1 | 12/2006 | Katou et al. |
| 2007/0062268 A1 | 3/2007 | Blossfeld et al. |
| 2007/0295076 A1 * | 12/2007 | Blossfeld et al. ............ 73/146.8 |
| 2010/0024539 A1 * | 2/2010 | Hamm et al. ................ 73/146.8 |

* cited by examiner

VALVE ARRANGEMENT AND CONSTRUCTION KIT FOR A VALVE ARRANGEMENT

BACKGROUND OF THE INVENTION

The invention concerns a valve assembly having a valve body for filling and emptying a vehicle tire and having a measuring device for measuring the vehicle tire pressure, in which the measuring device is prevented by a locking means from performing an axial movement in a pulling direction pointing away from the valve body on the measuring device, the locking means comprising at least one profile element having at least one fixing element engaging the valve body.

A valve assembly is described for example in EP 0 751 017 B1. With the known valve assembly, the housing of the measuring device is braced against the valve body from the interior of the wheel by means of a fixing screw. A disadvantage here is the time-consuming fitting operation, as the fixing screw must be guided in a poorly accessible region through a housing opening in the measuring device and screwed into an internal thread of the valve body. Further, the high weight of the fixing screw is a disadvantage, which must be compensated by corresponding balance weights.

Apart from fixing the measuring device to the valve body of a vehicle tire valve by means of a fixing screw, valve assemblies in which the valve body is partially surrounded by the housing of the measuring device by injection moulding and the measuring device is in this way prevented from performing an axial movement relative to the valve body are used. This known embodiment has a lower weight than the previously described embodiment with fixing screw. A disadvantage is, however, that the known valve assembly is comparatively inflexible to use, as the valve body must be fixed to the measuring device already during manufacture of the housing of the measuring device. At a later time, when fitting the valve assembly in the vehicle wheel, use of an alternative valve body with the finished measuring device is then no longer possible.

In DE 10 2006 043 873 A1, as in similar embodiments of DE 10 2004 048 244 A1 or DE 196 13 936 A1, a valve body is mounted on a measuring device by means of a clip which must be introduced into a recess of the valve body radially to the axis of the valve body only after passing the valve body through a housing of the measuring device—for this purpose, for example, a standard C clip or E clip is clipped onto the valve body. Here too, fitting is comparatively time-consuming.

EP 1 736 328 A1 discloses a measuring device of which the housing attachment, which is constructed as a snap-fit element, can be introduced into a collar opening in the valve body by radial bending and engage behind the collar, the collar and the snap-fit element being coordinated with each other, which makes the assembly disadvantageously inflexible.

It is therefore the object of the invention to propose a valve assembly which on the one hand is flexible to use and can be fitted in an improved manner and in which on the other hand the locking means has a low weight. Further, the objects consists of providing a kit for a valve assembly of this kind.

SUMMARY OF THE INVENTION

This object is achieved by providing a valve assembly comprising a valve body for filling and emptying a vehicle tire and having a measuring device for measuring the vehicle tire pressure, locking means for preventing the measuring device from performing an axial movement in a pulling direction pointing away from the valve body on the valve body, the locking means comprising a profile element having a fixing element engaging the valve body, wherein the valve body passes through a feed opening in the profile element, the fixing element comprises a claw element projecting radially relative to the valve body and contacts a surface of the valve body.

The kit according to the invention includes, apart from the valve body and the measuring device, at least one profile element having at least one fixing element for engaging, i.e. co-operating, with the valve body.

Fitting the valve assembly is simplified if the position of the valve body in the fitted state relative to the measuring assembly with the profile element is clearly defined. This is accomplished in the invention by the fact that in the profile element, in particular in the surface section, is formed a feed opening through which the valve body passes in the fitted state of the valve assembly. During fitting, the measuring assembly is fitted with the feed opening of the profile element over the valve body in the direction of fitting opposite the direction of pulling, the at least one fixing element clawing and/or latching to the valve body.

According to the invention it is further provided that the fixing element is designed as a claw element projecting radially from the profile element relative to the valve body, the at least one fixing element clawing, i.e. clinging to, a suitably shaped surface of the valve body. The fixing element is preferably sprung in the axial direction to enable fitting, that is, assembly of the valve body and the profile element fixed to the measuring device.

The invention is based on the concept of designing the locking means as a profile element which is preferably designed as a stamped and bent metal part and which has at least one fixing element, the fixing element directly engaging the valve body, locking the relative axial position, and preferably being held on or fixed to the measuring device, in particular its housing. In the fitted state the valve body is fixed to the vehicle wheel rim, for example by inserting a rubber seal in a corresponding wheel rim opening and/or by means of a fixing nut. During automotive operation the measuring device is pressed towards the valve body due to the operative centrifugal forces. The at least one profile element with fixing element serves to prevent the measuring device from being pulled off the valve body in the direction opposite the fitting direction, and so locks the measuring device to the valve body in a pulling direction away from the valve body. Due to the design of the locking means according to the invention as at least one profile element, the advantageous result is that the locking means has a lower weight in particular compared with fixing screws known from the state of the art, which has a positive effect on the running behaviour of a vehicle wheel equipped with a valve assembly according to the invention. Further, the valve assembly according to the invention is flexible to use, as fixing of the measuring device does not have to take place directly during manufacture of the measuring device, in particular the housing of the measuring device, and so a certain valve body must be permanently associated with a certain measuring device. Instead, even when fitting of the valve assembly on the wheel rim it can be decided what kind of valve body is to be associated with the measuring device. By this means inter alia the stock-keeping costs are reduced, as it is not necessary to keep a large number of different, ready-made valve assemblies with different valve bodies.

Advantageous developments of the invention are provided in the subsidiary claims. Within the scope of the invention also come all combinations of at least two of the characteristics disclosed in the description, the claims and/or the figures.

To obtain a profile element with as low a weight as possible, in a development of the invention it is advantageously provided that the profile element is substantially disc-shaped, that is, as flat as possible. "Disc-shaped" is also intended to mean a profile element in which the at least one fixing element is deflected out of the plane of the disc.

Alternatively it is conceivable to make the profile element three-dimensional, with a surface section arranged substantially transversely to the pulling direction and a wall section which extends from this surface section substantially in an axial direction and which is in turn adjoined by a holding collar angled in a radial direction. A profile element equipped in this way can advantageously be fitted in a housing of the measuring device, in particular in a recess formed in the latter, the holding collar gripping the housing of the measuring device from behind and so preventing the profile element on the measuring device from sliding axially relative to the measuring device.

It is of particular advantage to prevent the profile element on the measuring device from rotating. This can be accomplished for example by the fact that the profile element has a polygon contour which is held in a corresponding recess congruent in shape at least in one section within the measuring device, in particular within the housing of the measuring device. In addition or alternatively it is possible to prevent the measuring device from rotating relative to the valve body, for example in which the valve body is equipped with a polygon section which at least in one section is held in the measuring device with congruent shape.

In addition to design of the fixing element as a claw element, the fixing element can be designed as a simple latch element which co-operates in form-locking latching relationship with at least one corresponding latch projection on the outside of the valve body and does not automatically have to exert a clamping force in a radial direction on the valve body.

It is preferred if the locking action of the fixing element, in particular the claw element, is assisted by a clamping force acting in a radial direction on the valve body.

An optimum locking action of the profile element can be achieved in a development of the invention by the fact that the at least one fixing element is angled, that is, inclined or bent, relative to a plane running perpendicularly to the longitudinal axis of the valve body. Preferably the at least one fixing element is angled in the pulling direction, that is, in the dismantling direction, and so in the direction opposite the direction of fitting, and is therefore locked against the pulling direction of the measuring device and so prevents the measuring device from being pulled off the valve body in the fitted state of the valve assembly. Due to the angled arrangement of the fixing elements, both a spring action in an axial direction and a spring action in a radial direction, that is, an application of clamping force to the valve body in a radial direction, can be accomplished.

Locking of the measuring device to the valve body can take place in two basically different ways. Firstly, it is conceivable to lock the measuring device to the valve body non-releasably by means of the fixing element. For this purpose the fixing element which is in particular designed as a claw element co-operates in force-locking and/or form-locking relationship with a rough valve body surface and/or with at least one, preferably several parallel circumferential grooves in the outer circumference of the valve body. "Non-releasably" here means that the profile element would have to be damaged or severely bent to separate the measuring device from the valve body.

Secondly, it is conceivable to lock the measuring device releasably to the valve body by means of the fixing element in order to enable dismantling of the valve assembly. For this purpose it is conceivable that the fixing element co-operates with an external thread of the valve body, so that the measuring device can be fitted in the axial direction opposite the pulling direction on the valve body, but if necessary can be released from the valve body again by rotating in the circumferential direction relative to the valve body. It is advantageously prevented from being easily pulled off axially in the pulling direction by the at least one fixing element which engages in the external thread of the valve body.

To increase the locking action of the at least one, preferably the only, profile element, in an embodiment of the invention it is provided that the profile element has several fixing elements, in particular claw elements, which cooperate with the valve body. An embodiment in which the fixing elements are arranged in the circumferential direction, preferably defining the outside of the feed opening in the profile element, is preferred here.

An embodiment in which the profile element is made of metal is preferred. Design as a stamped and bent metal part which can be mass-produced is possible here.

The measuring device has at least one sensor for detection of the tire pressure, the sensor being connected to an electronic measuring device which transmits the in particular electronically processed result of measurement to a receiving device spaced apart from the measuring assembly and the vehicle wheel. An embodiment in which the valve body forms part of an aerial for sending the signals to the receiving device or in which the valve body forms the aerial is preferred. For this purpose the valve body must be connected in signal-conducting relationship to the electronic measuring device, in particular to a board contact of the electronic measuring device. It is advantageous if the profile element assumes this function. In this case the profile element has a dual function. Firstly, it serves to lock the measuring device to the valve body against axial sliding, and secondly, it connects the valve body (aerial) in signal-conducting relationship to the electronic measuring device.

For contacting of the electronic measuring device, in a development of the invention at least one contact pin which is preferably arranged in the region of the holding collar is provided on the profile element.

The kit according to the invention is distinguished by the fact that it can be assembled particularly flexibly, in particular to the effect that for different applications the kit can be assigned differently designed valve bodies which preferably can be fitted with the same kind of measuring devices.

BRIEF DESCRIPTION OF THE DRAWINGS

Practical examples of the invention will now be described below with the aid of the drawings in comparison with the state of the art, which is also shown partly. These are not necessarily intended to show the practical examples to scale, but instead the drawings are, where it serves to illustrate, in schematised and/or slightly distorted form. With respect to additions to the instructions which can be seen directly from the drawings, reference is made to the relevant state of the art. It must be taken into consideration here that many modifications and alterations concerning the shape and detail of an embodiment can be made without departing from the general idea of the invention. The characteristics of the invention disclosed in the description, in the drawings and in the claims may be essential both individually and in any combination for the development of the invention. Also within the scope of the invention come all combinations of at least two of the characteristics disclosed in the description, the drawings and/or the claims. The general idea of the invention is not confined to the exact shape or detail of the preferred embodiment shown and described below, or confined to a subject which would be limited compared with the subject claimed in the claims. With given ranges of quantities, values which are within the given limits are also intended to be disclosed as limit values and capable of being used and claimed as desired.

DETAILED DESCRIPTION

In the figures, identical parts and parts with the same function are marked with the same reference numbers.

Figure 1:
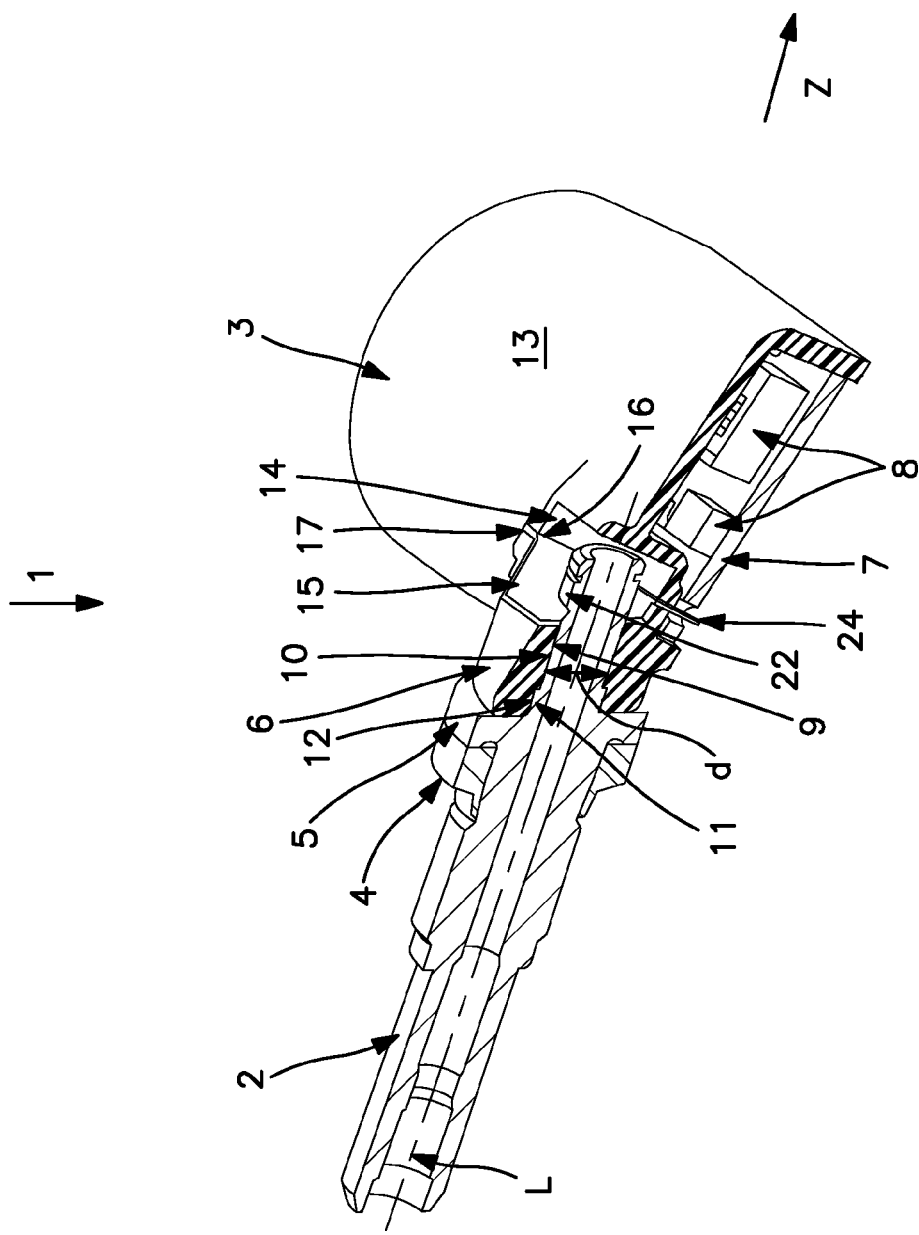
FIG. 1: a first perspective partly sectioned view of the valve assembly.
Figure 2:
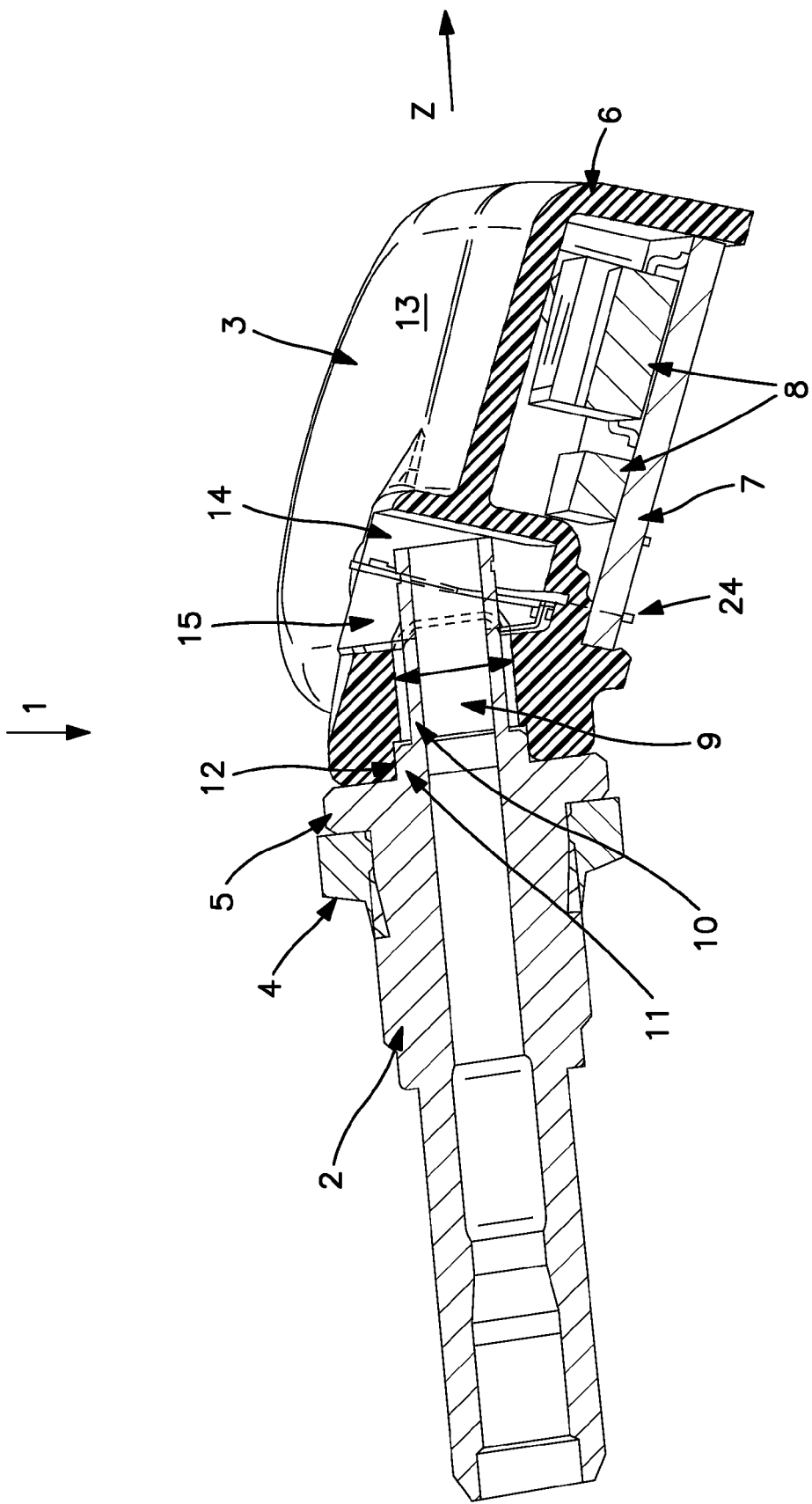
FIG. 2: a second partly sectioned perspective view of a valve assembly from a different angle of viewing.

In FIGS. 1 and 2 is shown a valve assembly 1. The valve assembly 1 essentially consists of a valve body 2 of which the interior, which is known in the art, is not shown in the figures for reasons of clarity, and a measuring assembly 3 for measuring the gas pressure in a vehicle tire.

In the fitted state the valve body 2 is fixed to a vehicle wheel rim, not shown. In the valve body 2 shown, this takes place by passing the valve body 2 through a corresponding opening in the vehicle wheel rim and inserting a ring seal arranged at the outer circumference of the valve body in the wheel rim opening. The ring seal 4 is here supported in an axial direction on a circumferential shoulder 5 of the valve body 2. From the outside of the wheel rim, the valve body 2 is locked by means of a nut, not shown, which is screwed onto an external thread of the valve body.

With a side of the circumferential shoulder 5 opposite the ring seal 4, the valve body 2 abuts against a plastic housing 6 of the measuring device 3 made by injection moulding. The plastic housing 6 protectively surrounds an electronic measuring device 8 with pressure sensor arranged on a board 7.

The valve body 2 is with a rear section 9 passed through a stepped holding channel 10 in the plastic housing 6 of the measuring device 3, a square section 11 of the rear section 9 being surrounded with congruent shape by a front holding channel section 12 and so forming means to prevent rotation.

In the plastic housing 6 is formed a recess 14 accessible from an upper side 13 of the plastic housing 6, the rear section 9 of the valve body, which is cylindrical in this region, extending with its free end region through the holding channel 10 into the recess 14. In the recess 14 is held a profile element 15 which serves as a locking means to prevent the measuring device 3 from being pulled off the valve body 2 in an axial pulling direction Z. For this purpose the profile element 15, which is designed as a stamped and bent part, is fixed to the plastic housing 6 within the recess 14. It is supported on the plastic housing 6 in an axial direction by means of a holding collar 16 which points in a radial direction and which engages in a corresponding radial groove 17 in the plastic housing 6.

Figure 3:
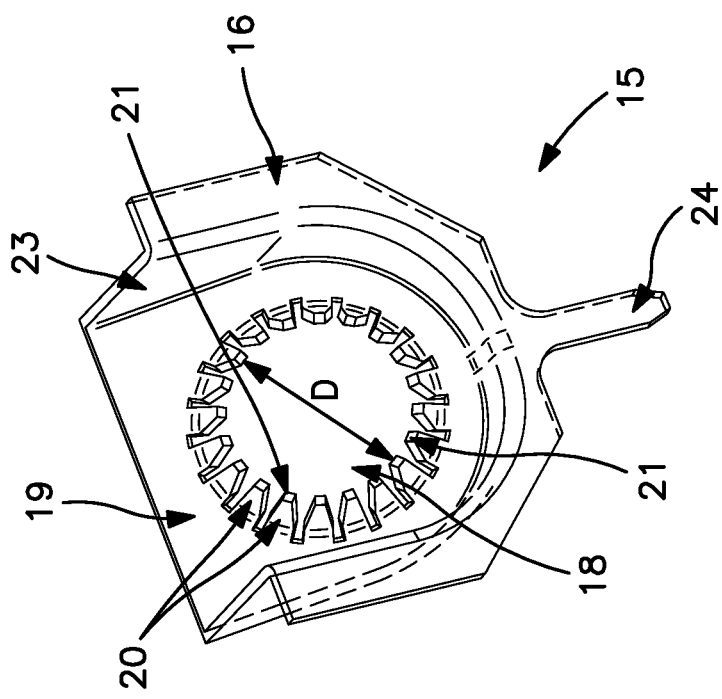
FIG. 3: a perspective view of a profile element with a plurality of fixing elements arranged in a ring and designed as claw elements.

The metal profile element 15 is shown in detail in FIG. 3. A central feed opening 18 can be seen within a front contact surface 19 (surface section). As shown in particular by FIGS. 1 and 2, the profile element 15 is arranged in such a way that the contact surface 19 extends transversely to a longitudinal axis L of the valve body 2 and so transversely to the pulling direction L.

The feed opening 18 is circumferentially bound by a plurality of fixing elements 20 which are evenly distributed over the circumference of the feed opening 18 and designed as claw elements and which are angled in the pulling direction Z, that is, in the direction opposite the direction of fitting relative to the contact surface 19. During fitting the valve body 2 and the measuring device 8 are moved relative to each other in the direction opposite the pulling direction Z in such a way that the rear section 9 of the valve body 2 is displaced through the feed opening 18. In the process the strip-like fixing elements 20, before feeding the valve body 2 through the feed opening 18, lie with their free ends 21 in a circumferential circle of which the diameter D is smaller than the outside diameter d of the rear section 9 of the valve body 2, so that the fixing elements 20 which are sprung in the axial and radial directions are forced slightly outwards when the valve body 2 is pushed through the feed opening, and so exert a clamping force in a radial inward direction on a valve body surface 22. The valve body surface 22 is roughened (not shown for reasons of clarity), so that the fixing elements 20 engaging the valve body surface 22 are supported on the rough valve body surface against application of a pulling force in the pulling direction Z on the measuring device 3, and so are locked against application of a pulling force, as a result of which in turn displacement of the measuring device 3 in the direction opposite the fitting direction in the pulling direction Z is prevented.

Instead of a roughened surface, at least one circumferential groove can be formed in the valve body surface 22. Preferably several circumferential grooves spaced apart in the axial direction are provided. For releasable fastening, an external thread can be formed in the valve body surface 22, in which case the square section 11 should be dispensed with in order to be able to rotate the measuring device 3 in the circumferential direction relative to the valve body 2 and so release it in the pulling direction Z.

As shown in particular by FIG. 3, adjoining the contact surface 19 of the profile element 15 is a wall section 23 which extends in an axial direction and which has a greater axial extent in an upper region than in a lower region, so that an imaginary plane passing through the radial holding collar 16 adjoining the axial wall section 23 forms an angle with the holding surface 19, this imaginary plane running approximately perpendicularly to the board 7 with the electronic measuring device 8 and perpendicularly to the upper side 13 of the plastic housing. The axial wall section 23 is not circumferentially closed, but the profile element 15 is open in an upper region. In a lower region the axially extending wall section 23 is semi-circularly curved and arranged coaxially with the feed opening 18.

The holding collar 16 is polygonally contoured and forms together with the radial groove 17 of congruent shape a means to prevent rotation of the profile element 15 which is inserted in the recess 14 from above during fitting thereof.

The holding collar 16 is formed in a lower section in one piece with a contact pin 24 which serves for contacting of the electronic measuring device 8 arranged on the board 7. For this purpose the contact pin 24 is passed through the board 7 and connected, in particular soldered, in signal-conducting relationship to a strip conductor, not shown in more detail. Via the contact pin 24, the valve body 2 is connected in signal-conducting relationship to the electronic measuring device 8 and serves as an aerial for sending measurement signals to a receiving device, not shown, of the valve assembly.

The invention claimed is:

1. Valve assembly comprising a valve body for filling and emptying a vehicle tire and having a measuring device for measuring the vehicle tire pressure, locking means for preventing the measuring device from performing an axial movement in a pulling direction pointing away from the valve body on the valve body, the locking means comprising a profile element non-rotatably mounted to the measuring device and non-rotatable relative to the measuring device, the profile element having a fixing element engaging the valve body, wherein the valve body passes through a feed opening in the profile element, the fixing element comprises a claw element projecting radially relative to the valve body and contacts a surface of the valve body, wherein the claw element is sprung in an axial direction to enable assembly of the valve body and the profile element while the profile element is mounted to the measuring device, and further comprising means for non-rotatably mounting the profile element to the measuring device such that the profile element is non-rotatable relative to the measuring device, wherein the means for non-rotatably mounting comprises a holding collar extending outwardly from the profile element and having a polygon outer shape, and a recess in the measuring device having a shape corresponding to the polygon outer shape whereby the profile element, when mounted in the recess of the measuring device, is non-rotatable relative to the measuring device.

2. Valve assembly according to claim 1, wherein the profile element is substantially disc-shaped.

3. Valve assembly according to claim 1, wherein the profile element comprises a holding collar engaging the measuring device and angled in a radial direction relative to a wall section which extends substantially in an axial direction.

4. Valve assembly according to claim 1, wherein the fixing element exerts a clamping force in a radial direction on the valve body.

5. Valve assembly according to claim 1, wherein the fixing element comprises a strip element.

6. Valve assembly according to claim 1, wherein the fixing element is angled in the pulling direction (Z) relative to a plane running perpendicularly to a longitudinal axis (L) of the valve body.

7. Valve assembly according to claim 1, wherein the fixing element cooperates in locking relationship with the valve body.

8. Valve assembly according to claim 1, wherein the fixing element cooperates in releasably locking relationship with an external thread of the valve body.

9. Valve assembly according to claim 1, wherein the profile element includes several fixing elements which are spaced apart in the circumferential direction.

10. Valve assembly according to claim 9, wherein the fixing elements are evenly distributed in the circumferential direction.

11. Valve assembly according to claim 1, wherein the profile element is made of a stamped and bent metal part.

12. Valve assembly according to claim 1, wherein the valve body forms an aerial of the measuring device for transmitting signals to a receiving device arranged at a distance from the gas tire, wherein the profile element forms a contacting element for signal-conducting contacting of an electronic measuring device arranged on a board with the valve body.

13. Valve assembly according to claim 12, wherein the contacting element comprises at least one contact pin.

14. Valve assembly according to claim 1, wherein the valve assembly forms part of a kit.

15. Valve assembly according to claim 14, wherein the profile element is supported in an axial direction on the measuring device on a housing.

16. Valve assembly according to claim 15, wherein the valve body is passed through the profile element in an axial direction opposite the pulling direction (Z), and the measuring device is held in its axial position by the fixing element of the profile element on application of a pulling force in the pulling direction.

17. Valve assembly according to claim 1, wherein the valve body and the claw element are non-releasable after they are assembled to each other.

18. Valve assembly according to claim 3, wherein the profile element further comprises a contact surface in a plane angled relative to the holding collar, the wall section extending axially between the holding collar and the contact surface, and the claw element being defined on the contact surface.

* * * * *